United States Patent [19]

Cidon et al.

[11] Patent Number: 5,572,526
[45] Date of Patent: Nov. 5, 1996

[54] METHOD AND APPARATUS FOR IMPROVED THROUGHPUT IN A MULTI-NODE COMMUNICATION SYSTEM WITH A SHARED RESOURCE

[75] Inventors: Israel Cidon, Bronx; Leonidas Georgiadis, Chappaqua; Roch A. Guerin, Yorktown Heights, all of N.Y.; Yuval Y. Shavitt, Technion, Israel; Andrew E. Slater, Yorktown Heights, N.Y.

[73] Assignee: International Business Machines Corporation, Armonk, N.Y.

[21] Appl. No.: 471,571

[22] Filed: Jun. 6, 1995

Related U.S. Application Data

[63] Continuation of Ser. No. 192,884, Feb. 7, 1994, Pat. No. 5,467,352.

[51] Int. Cl.⁶ .................................................. H04J 3/00
[52] U.S. Cl. .................................................. 370/85.5
[58] Field of Search .......................... 370/85.1, 85.4, 370/85.5, 85.6, 94.1, 94.2, 60, 60.1, 85.14, 85.12, 85.15, 85.13; 340/825.05, 825.5, 825.51, 825.52, 825.06, 825.07, 825.4

[56] References Cited

U.S. PATENT DOCUMENTS

| | | | |
|---|---|---|---|
| 4,675,671 | 6/1987 | Ishizuka et al. | 340/825.05 |
| 4,926,418 | 5/1990 | Cidon et al. | 370/85.5 |
| 5,001,707 | 3/1991 | Kositpaiboon et al. | 370/94.1 |
| 5,008,663 | 4/1991 | Adams | 340/825.5 |
| 5,124,981 | 6/1992 | Golding | 370/85.1 |
| 5,155,725 | 10/1992 | Khalil | 370/85.5 |
| 5,157,657 | 10/1992 | Potter et al. | 340/85 |
| 5,175,537 | 12/1992 | Jaffe et al. | 340/825.5 |
| 5,467,352 | 11/1995 | Cidon et al. | 370/85.5 |
| 5,477,530 | 12/1995 | Ahmadi et al. | 370/85.12 |

OTHER PUBLICATIONS

R. Falconer and J. Adams; "Orwell: A Protocol for an Integrated Services Local Network"; Oct. 4, 1985; *British Telecom Technology Journal*; vol. 3 No. 4 pp. 27–35.

*Primary Examiner*—Douglas W. Olms
*Assistant Examiner*—Dang Ton
*Attorney, Agent, or Firm*—Heslin & Rothenberg, P.C.; Wayne F. Reinke, Esq.

[57] ABSTRACT

A non-quota access indicator is circulated among nodes in a multi-node quota based communication system with a shared resource, indicating maximum possible non-quota access to the shared resource to a given node receiving same. Upon arrival at a node, the indicator is saved and then updated to reflect the current status of that node as either starved or satisfied, the former being a condition of currently having quota remaining and a shared resource access requirement, and the latter being a condition of either currently having no remaining quota or having no current shared resource access requirement. After updating, the node immediately propagates the indicator to the next node in the system. When a node without quota requires access to the shared resource, it compares its requirement to the last stored indicator and accesses the shared resource if the stored indicator is equal to or greater than the access requirement.

3 Claims, 2 Drawing Sheets

METHOD AND APPARATUS FOR IMPROVED THROUGHPUT IN A MULTI-NODE COMMUNICATION SYSTEM WITH A SHARED RESOURCE

This application is a continuation, of application Ser. No. 08/192,884, filed Feb. 7, 1994 now U.S. Pat. No. 5,467,352.

BACKGROUND OF THE INVENTION

1. Technical Field

The present invention generally relates to multi-node communication systems with shared resources. More particularly, the present invention relates to improving throughput in multi-node communication systems with shared resources and employing a shared resource access quota scheme.

2. Background Art

In the past, multi-node communication systems, such as local area networks, including both ring networks and bus networks, have managed node access to shared resources by limiting access thereto via mechanisms such as polling, random access, time slot and quota allocation mechanisms. The mechanisms proposed have generally attempted to provide fair access to the shared resources by the nodes. Some quota schemes have equalized the node throughputs by allocating the same quota to each node.

However, allocating the same quota to each node does not achieve optimism efficiency with regard to system throughput. The task of determining and tracking the allocation of different quotas among nodes is difficult and requires a large amount of information exchange, especially in systems where loading conditions fluctuate or loading is asymmetrical. Thus, most quota schemes have centered on the allocation of the same quota to all nodes. One such quota scheme is described in U.S. Pat. No. 4,926,418 issued to Cidon et al. and assigned to IBM (hereinafter, "the Cidon patent"), the disclosure of which is herein incorporated by reference in its entirety.

Thus, a need exists for improved efficiency in multi-node communication systems with shared resources employing a fixed quota scheme in order to allow for improved throughput in the case of an asymmetrically loaded system or a system whose load fluctuates.

SUMMARY OF THE INVENTION

Briefly, the present invention satisfies the need for improved efficiency in multi-node communication systems by providing a method and apparatus for allowing nodes currently without access quota to access a shared resource so long as access by nodes with quota remaining is not affected.

The basic method requires a communication system having a plurality of nodes and a shared resource, and which employs a shared resource access quota scheme for node access to the shared resource. A non-quota access indicator is circulated among the nodes. The non-quota access indicator indicates a maximum possible non-quota access by a given node, currently without quota, without affecting quota access by other nodes in the system. In response to receipt by the given node, the non-quota access indicator is updated to reflect a current status of the given node as either starved or satisfied. A status of starved is defined as having quota and an access requirement for the shared resource. A status of satisfied is defined as either having no quota remaining or no access requirement for the shared resource.

Where the shared resource is a bidirectional communication path, the non-quota access indicator may be circulated in a direction opposite that of system information traffic. Where the shared resource is a unidirectional communication path, an access requirement status indicator is circulated among the nodes. The status indicator indicates a current status for each node in the system as either currently starved or satisfied.

The present invention also includes a method for a given node in the system to indicate to other nodes a status change of the given node which affects possible non-quota access by the other nodes to the shared resource. The status change is between a status of starved and a status of satisfied or vice-versa. When a status change of the given node is detected, a non-quota access update indicator is issued therefrom and propagated.

The present invention also includes a communication system implementing the above principles.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
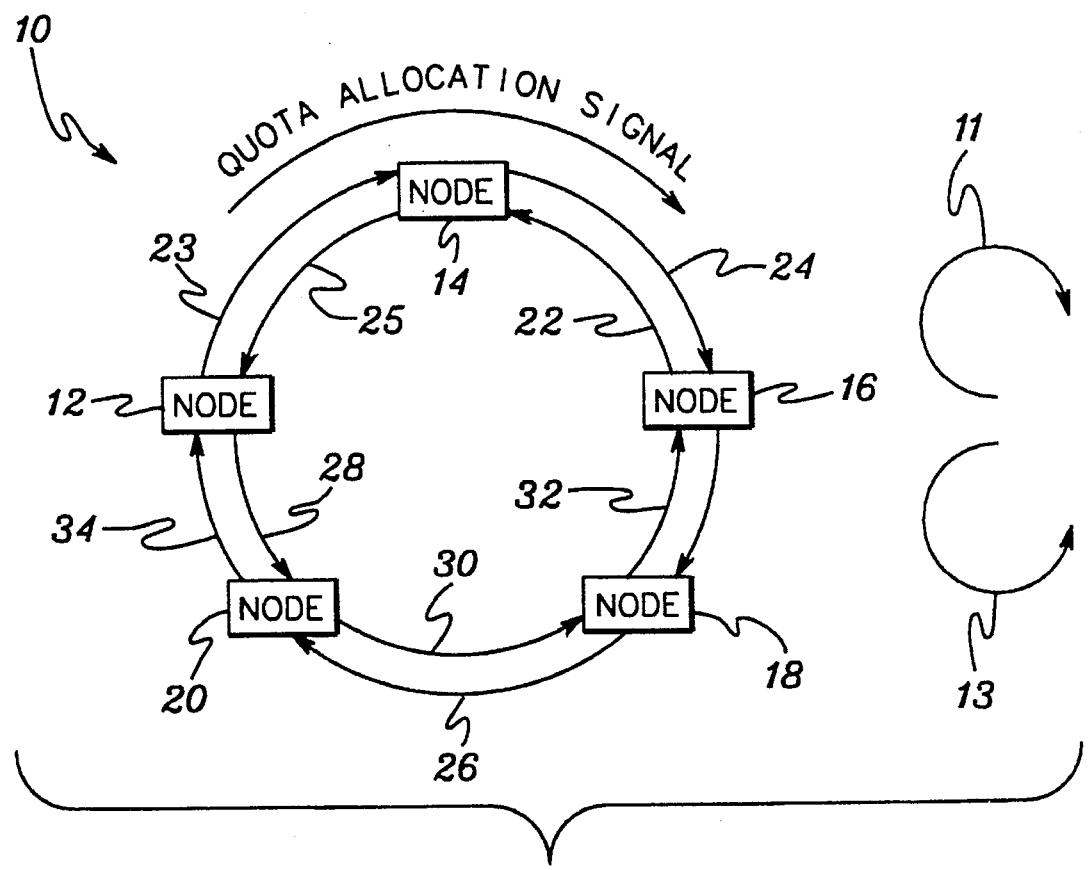
FIG. 1 depicts a five-node communication system according to the present invention with a bidirectional ring architecture.

FIG. 1 depicts a five-node bidirectional communication ring 10 including nodes 12, 14, 16, 18 and 20. Communication ring 10 comprises two distinct rings-clockwise ring 11 and counterclockwise ring 13. Between any two consecutive nodes are two communication links, for example, links 22 and 24 between nodes 14 and 16. Link 22 provides a path for information to travel from node 16 to node 14, and link 24 provides a path for information to travel from node 14 to node 16. For each ring there is a set of control signals, a quota allocation signal and an INFO signal (to be described subsequently), rotating on the other ring. In addition, a given node with information to transmit to another node will choose the shortest path provided on either ring for the transmission. A given quota allocation signal therefore travels in the opposite direction of the information traffic it regulates. A given quota allocation signal, when received at a given node, allocates quota to that node, i.e., it allows that node to transmit a certain amount of information on the relevant ring. The following example will focus only on a quota allocation signal and INFO signal circulating on counterclockwise ring 13 regulating information traffic on ring 11, the description for the other set of signals being similar.

Assume, for exemplary purposes, that nodes 20 and 12 each currently have information to transmit to node 14. Assume also that node 16 currently has no quota, but has information with a destination of node 20. Under the quota allocation scheme of the Cidon patent, node 16 must wait until its quota is refreshed via the quota allocation signal to transmit to node 20.

The present invention improves throughput on the ring by allowing node 16, although currently without quota, to transmit the information to node 20 prior to the next visit of the quota allocation signal if quota transmissions by the other nodes are not affected. This non-quota access can only be utilized by a node after its quota has been exhausted. A first aspect of the present invention provides a second signal, the INFO signal, traveling on counterclockwise ring 13. The INFO signal contains a HOPCOUNTER, indicating to a given node the current number of downstream nodes plus one that either do not currently have quota remaining or information to transmit (i.e., are currently satisfied). The term "downstream" is used in the sense of information flow. In other words, the HOPCOUNTER informs a given node how far ahead on ring 10 it may currently transmit information (or how many nodes away it can "hop" to) without quota. In general, a given node with quota remaining and information to transmit is referred to as being "starved", and a node currently either without information to transmit or having no quota remaining is referred to as "satisfied".

As described in the Cidon patent, benefits are realized by propagating the quota allocation signal in a direction opposite the information traffic it regulates. The INFO signal also preferably travels opposite the information traffic and separately from the quota allocation signal, in order to propagate it quickly through ring 10. Under heavy loading conditions, the INFO signal traveling separately from the quota allocation signal may circulate several times around ring 10 in the time it takes the quota allocation signal to make one round trip. Thus, system throughput may be maximized if both the INFO signal and the quota allocation signal travel separately and in a direction opposite the information traffic regulated thereby.

Figure 4:
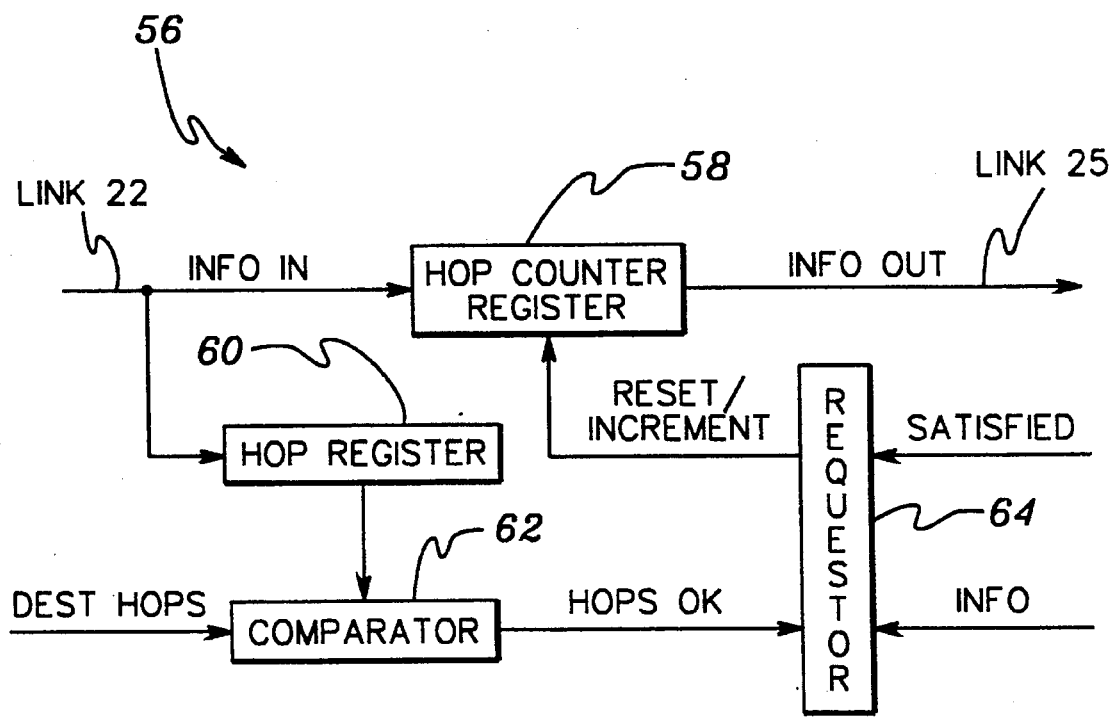
FIG. 4 depicts, in block diagram form, circuitry within the node of FIG. 3 for implementing the present invention.

When a node receives the INFO signal, it immediately stores the HOPCOUNTER in local memory (see FIG. 4). The node stores the HOPCOUNTER so that whenever it has information to transmit and is out of quota, it checks to see if the destination for the information is within the stored HOPCOUNTER distance. If a node is satisfied, the node increments the HOPCOUNTER by one when received and immediately propagates it to the next upstream node. When a starved node receives the INFO signal, the node resets the HOPCOUNTER to one and propagates the INFO signal to the next upstream node. In the present aspect, a node always assumes that an upstream neighbor may transmit to it, hence, resetting the HOPCOUNTER to one when starved. A maximum value for the HOPCOUNTER above which it is not incremented may be chosen, as a function of the number of nodes in the ring and the number of bits in length the HOPCOUNTER is.

Assume now that node 20 is satisfied and node 18 is satisfied with information destined for node 12. Assume also that node 20 has just received the INFO signal from node 12 over link 28. Node 20 stores the HOPCOUNTER (assume it has a value of one), increments it to a value of two since it is satisfied and propagates the INFO signal to node 18 over link 30. When node 18 receives the INFO signal, it immediately stores the HOPCOUNTER value, increments it by one since it is satisfied and propagates the INFO signal to node 16 over link 32. Node 18 may now transmit without quota to node 12 over links 26 and 34, since the destination of its information, node 12, is two nodes away and its most recently stored HOPCOUNTER has a value of two, i.e., the destination node is equal to or less than the most recently stored HOPCOUNTER value.

In a second aspect of the present invention, a given node generates an INFO signal whenever its status changes from satisfied to starved or vice-versa. The benefits of such an INFO signal "on demand" scheme, instead of only circulating a single INFO signal, are illustrated by the following two examples. First, consider a satisfied node having quota left, but no information to transmit. When the node gets an INFO signal, it immediately stores the HOPCOUNTER, increments it (since it is satisfied) and sends the INFO signal on. Just after propagating the INFO signal, the node receives information to transmit. The node's status has changed from satisfied to starved. Thus, the HOPCOUNTER just sent by that node is inaccurate and will remain so, with respect to that node, until the INFO signal next arrives there. An on demand scheme would allow the node to issue another correct INFO signal immediately, rather than waiting to correct the first one.

Second, consider a starved node. The node receives the INFO signal, stores the received HOPCOUNTER, resets the HOPCOUNTER to one (since it has information to transmit and quota remaining) and propagates the INFO signal. Shortly after propagating the INFO signal, the node finishes transmitting its information or runs out of quota. The status of the node has changed from starved to satisfied. Thus, non-quota transmissions which might otherwise be allowed upstream will not take place until the INFO signal is corrected when it next arrives at the node.

In this second aspect of the present invention, the nodes in the two examples above would each issue a new INFO signal in response to its status change. A given node receiving an INFO signal would check to see if the received HOPCOUNTER is different from or the same as the most recently stored HOPCOUNTER value. If the received and stored HOPCOUNTERs are the same, the node does not update the HOPCOUNTER nor propagate the INFO signal. If the compared HOPCOUNTERs are different, the node stores the received HOPCOUNTER. Then, if the node is satisfied, it updates the HOPCOUNTER (i.e., increments by one) and propagates the INFO signal. If the node is currently starved, it stores the received HOPCOUNTER but does not propagate the INFO signal. In addition, in the case of a bidirectional system, if a node receives an INFO signal with a HOPCOUNTER having a value equal to the number of nodes in the system, it does not update the HOPCOUNTER or propagate the INFO signal, since such a value implies that all nodes are currently satisfied and all nodes are aware that all nodes are satisfied. The same is true in a unidirectional system where the received HOPCOUNTER has a value equal to twice the number of nodes in the system.

Figure 2:
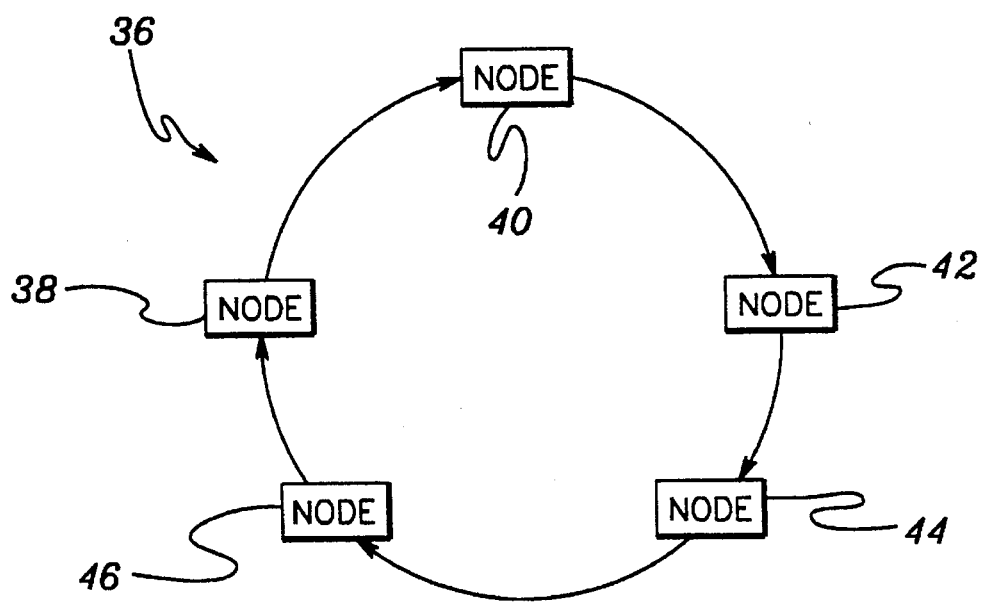
FIG. 2 depicts a five-node communication system according to the present invention with a unidirectional ring architecture.

The above two aspects of the present invention assume a bidirectional communication ring. However, some communication systems are unidirectional. FIG. 2 depicts a five-node unidirectional communication ring 36 with nodes 38, 40, 42, 44 and 46. In a third aspect of the invention, an INFO signal is circulated in the direction of information traffic and contains a bit map with a bit for the status of each node. A satisfied node has a status of one and a starved node has a status of zero. When a given node, e.g., node 40, receives the INFO signal, it determines from the bit map how many consecutive nodes ahead of it have a bit value of one (a HOP indicator) and stores this information in local memory. The node then updates its own bit on the bit map and propagates the INFO signal. A given node may transmit information if its last stored HOP indicator value is equal to or greater than the number of hops it needs to make to reach its destination node.

Figure 3:
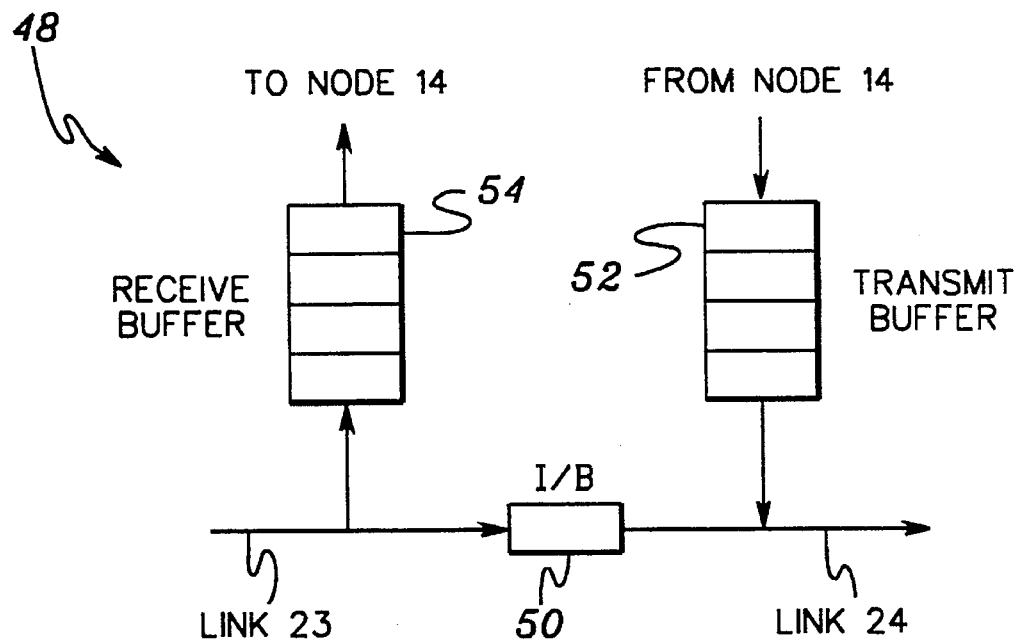
FIG. 3 depicts a portion of a node in FIG. 1 where a buffer insertion ring architecture is used.

In a fourth aspect of the present invention, apparatus implementing the above principles is presented. The fourth aspect of the present invention will be described with reference to ring 10 of FIG. 1 further described as a buffer insertion ring architecture, as it is known in the art. FIG. 3 depicts an input/output portion 48 of node 14. Insertion buffer 50 can store at most one maximal size packet of information. Node 14 may transmit information packets from transmit buffer 52 at any time, provided insertion buffer 50 is empty and no other nodes are transmitting over link 24 (ring traffic is given priority). If ring traffic is arriving on link 23 while node 14 is transmitting an information packet, the incoming packet is stored in insertion buffer 50 until the transmission is completed. If information destined for node 14 is received on link 23, it enters receive buffer 54. When node 14 has no information packets to transmit, ring traffic is not delayed in insertion buffer 50°.

FIG. 4 depicts INFO-subcircuit 56, in block diagram form, within node 14. INFO-subcircuit 56 comprises hopcounter register 58, hop register 60, comparator 62 and requestor 64. Hopcounter register 58 can be loaded, incremented, reset and read from. Hop register 60 can be loaded and read from. Comparator 62 compares two values and asserts a signal when certain conditions are met. Requestor 64 controls INFO-subcircuit 56. The operation of INFO-subcircuit 56 will now be described in detail.

When node 14 receives an INFO signal on link 22, hopcounter register 58 and hop register 60 are immediately loaded with the HOPCOUNTER. Requestor 64 responds to the INFO signal, active upon the loading of hopcounter register 58, by incrementing hopcounter register 58 if the SATISFIED signal is asserted. An assertion of the SATISFIED signal indicates that node 14 has exhausted its quota or transmit buffer 52 is empty. If the SATISFIED signal is not asserted, requestor 64 resets hopcounter register 58 to one. Immediately after the increment or reset operation, the INFO signal (with the HOPCOUNTER from hopcounter register 58) is sent on to node 12 over link 25.

In addition to updating the HOPCOUNTER, INFO-subcircuit 56 determines if a non-quota transmission by node 14 is possible. Comparator 62 compares the value in hop register 60 with a DestHops signal to determine if DestHops is less than or equal to the stored HOPCOUNTER in hop register 60. DestHops indicates the number of downstream "hops" the next information packet from transmit buffer 52 must make in order to arrive at its destination. If DestHops is less than or equal to the stored HOPCOUNTER, comparator 62 asserts a HopsOK signal, indicating to requestor 64 that the currently desired non-quota transmission is possible.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. In a communication system having a plurality of nodes and a shared unidirectional communication path and employing an access quota scheme for node access to said shared unidirectional communication path, a method for non-quota access by a given node without quota to said shared unidirectional communication path without affecting quota access by one or more of the other of said plurality of nodes, said method comprising the steps of:

circulating on said unidirectional communication path a status indicator among said plurality of nodes, said status indicator indicating a status for each of said plurality of nodes as either currently starved or satisfied; and updating said status indicator in response to arrival thereof at said given node to reflect said status of said given node.

2. A communication system, comprising:

a plurality of nodes including a first node;

a shared resource, wherein said communication system employs a shared resource access quota scheme for node access to said shared resource;

means for issuing from said first node a status change indicator for indicating a status change of said first node between a status of starved and a status of satisfied; and means for propagating said status change indicator.

3. The communication system of claim 2, wherein said issuing means comprises:

means for monitoring for said status change; and means for issuing from said first node to a second node a non-quota access update indicator, said non-quota access update indicator indicating to said second node a current possible maximum non-quota access thereby to said shared resource.

* * * * *

UNITED STATES PATENT AND TRADEMARK OFFICE
CERTIFICATE OF CORRECTION

PATENT NO. : 5,572,526
DATED : November 5, 1996
INVENTOR(S) : Cidon, et al

It is certified that error appears in the above-indentified patent and that said Letters Patent is hereby corrected as shown below:

Column 1, line 29, substitute --optimism for optimum--

Signed and Sealed this

First Day of April, 1997

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : 5,572,526

DATED : November 5, 1996

INVENTOR(S) : Cidon, et. al.

It is certified that error appears in the above-identified patent and that said Letters Patent is hereby corrected as shown below:

Column 1, line 29, substitute --optimum-- for "optimism"

This certificate supersedes Certificate of Correction issued April 1, 1997.

Signed and Sealed this

First Day of September, 1998

Attest:

BRUCE LEHMAN

Attesting Officer

Commissioner of Patents and Trademarks